April 20, 1948.   E. H. LAND   2,440,103
LIGHT-POLARIZING LAMINATION HAVING A PLURALITY
OF COPLANAR PROTECTIVE GLASS ELEMENTS
Filed Nov. 6, 1944

INVENTOR.
Edwin H. Land
BY Donald L. Brown
Attorney

Patented Apr. 20, 1948

2,440,103

UNITED STATES PATENT OFFICE 2,440,103

LIGHT-POLARIZING LAMINATION HAVING A PLURALITY OF COPLANAR PROTECTIVE GLASS ELEMENTS

Edwin H. Land, Cambridge, Mass., assignor to Polaroid Corporation, Cambridge, Mass., a corporation of Delaware Application November 6, 1944, Serial No. 562,213

3 Claims. (Cl. 88—65)

This invention relates to laminated light-polarizing material, and more particularly to a laminated light-polarizing element adapted for use in conjunction with a light source emitting substantial heat.

In many optical systems employing polarized light, it is desirable to position a sheet of light-polarizing material in close proximity to a light source and to provide said polarizing material with a transparent cover layer on the surface thereof away from said light source. However, it is often found that the heat emitted by the light source gives rise to thermal stresses in the protective layer, and these stresses in turn may cause stress birefringence in the cover layer, with the result that the polarized light transmitted by the system acquires an undesirable ellipticity of vibration. Similar effects may result from differential expansion between the cover layer and the mount therefor or some other element in the system. Furthermore, this ellipticity may have the additional disadvantage of varying nonuniformally over the entire area of the cover layer.

It is accordingly one object of the present invention to provide a transparent cover layer for light-polarizing material capable of use in close proximity to a light source emitting substantial heat without developing such undesirable birefringent stresses.

Another object is to provide such a polarizing element in the form of a layer of plastic light-polarizing material laminated to a protective cover layer comprising a glass plate which has been scored and cracked after said lamination has been made.

A further object is to provide such a polarizing element in the form of a layer of plastic light-polarizing material bonded by means of a relatively resilient adhesive material to a cover layer comprising a glass plate which has been scored and cracked into a plurality of coplanar pieces separated by hair-line cracks after said lamination has been made.

A still further object is to provide a light-polarizing laminations as outlined above wherein the cracks between the component portions of said glass plate are substantially filled with an adhesive material such as an organic resin which has been polymerized in situ in said cracks.

A still further object is to provide a laminated light-polarizing element as outlined above which will be particularly adapted for use in conjunction with a headlight for automotive vehicles and the like.

Additional objects and advantages will in part appear and in part be pointed out in the course of the following detailed description of one or more embodiments of the invention, which are given as nonlimiting examples, in connection with the accompanying drawings, in which.

One example of a case wherein the problem with which the present invention is concerned is particularly acute is in automotive vehicle headlighting systems employing polarized light. In such systems all vehicles should be provided with headlights emitting polarized light of predetermined polarization characteristics and also with suitable analyzer means adapted to block the polarized light from the headlights of another similarly equipped vehicle approaching from the front. It is highly desirable, however, to provide adequate protection to the outer surface of the polarizing material of the headlights, and although such protection may be satisfactorily supplied by providing protective cover plates of glass, this has not been entirely satisfactory owing to the fact that uneven absorption by the cover plates of heat emitted by the headlight produces relatively severe, birefringent, thermal stresses. The resulting birefringence or photoelastic effects may in turn so alter the polarization characteristics of the polarized light from the headlight that it cannot be properly extinguished by the analyzer in another vehicle.

In accordance with the present invention it has been discovered that the above difficulty can be overcome by utilizing as a cover layer for the polarizing material a sheet of ordinary glass which is bonded to the polarizing layer by means of a suitable adhesive material and is thereafter scored across the front thereof in such manner as to produce a plurality of hair-line cracks extending throughout the thickness of the glass layer, but not beyond the adhesive layer.

Figure 1:
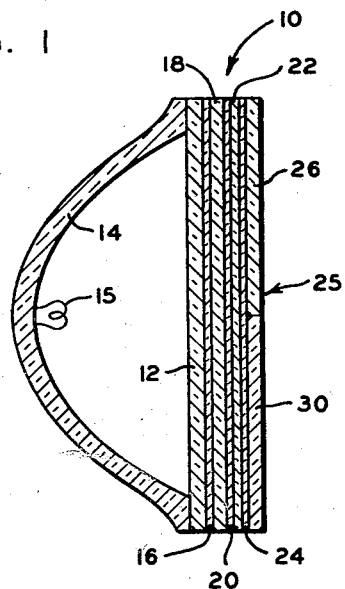
Figure 1 is a view in vertical section illustrating diagrammatically an automobile headlight embodying a form of the invention, said view being taken on the line 1—1 in Fig. 2.
Figure 2:
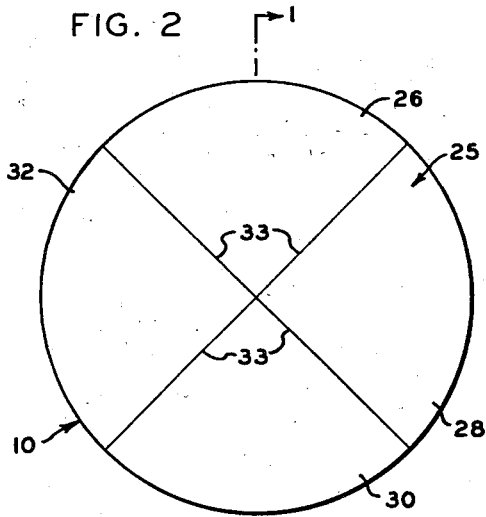
Figure 2 is a front view of the headlight shown in Fig. 1.

Figs. 1 and 2 illustrate a typical embodiment of the invention. Headlight 10 in Fig. 1 comprises a lens 12 secured in any suitable way to reflector 14 and enclosing therewith a filament 15 of any suitable type. On the front surface of lens 12 is a series of laminated layers comprising, respectively, adhesive 16, glass 18, adhesive 20, polarizing material 22, adhesive 24 and glass 25. Glass layer 25 in turn comprises a plurality of component sectors 26, 28, 30 and 32. Polarizing layer 22 may comprise any sheet polarizing material, such for example as one of those sold under the tradename "Polaroid." Particularly satisfactory results from the standpoint of heat stability have been obtained with the particular polarizing material shown in U. S. Patent No. 2,173,304, and comprising polyvinyl alcohol which has been stretched to orient the molecules thereof and heated during or after the stretching operation to a temperature such that some of the molecules thereof are converted by dehydration into polarizing molecules of polyvinylene. Adhesive layers 16, 20 and 24 may comprise any of a wide variety of transparent materials, preferably relatively resilient, and typical examples of satisfactory materials include plasticized incomplete polyvinyl acetals, such as polyvinyl butyral, and plasticized acrylic and methacrylic resins, such as methyl methacrylate, and the like.

In practicing the invention, a preferred procedure is first to bond polarizing layer 22 to a glass sheet 25 by means of the desired adhesive material. It is also convenient if the lamination to glass layer 18 take place at the same time. This process may be carried out in accordance with any suitable conventional laminating technique such as by means of heat and pressure. Thereafter glass layer 25 is scored by means of any suitable glass-cutting device in such manner as to cause said plate to separate along a series of substantially hair-line cracks 33. This lamination may then be bonded to headlight lens 12 by any suitable adhesive, and it will be found capable of transmitting the light polarized by layer 22 without developing appreciable birefringent stresses.

Figure 3:
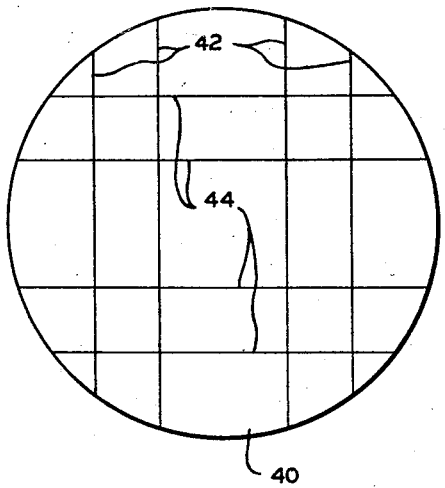
Figures 3 and 4 are views similar to Fig. 2 illustrating modifications of the invention.
Figure 4:
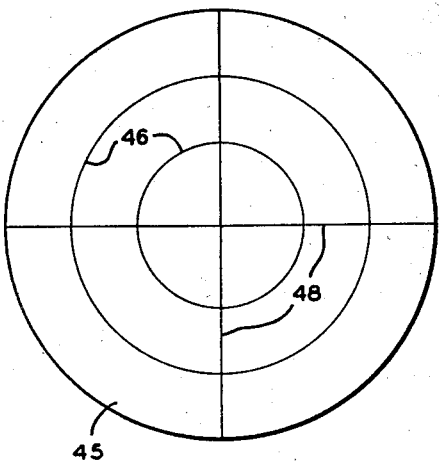

The above embodiment of the invention is subject to substantial modification without departing from the principles of the invention. Thus, for example, Fig. 3 is a front view of a polarizing lamination of the above type wherein glass layer 40 is provided with multiple cracks 42 and 44 which may be arranged in any desired relation to each other. Fig. 4 shows a further such arrangement wherein glass layer 45 is provided with circular cracks 46 as well as straight cracks 48, and many similar variations may be found advantageous under a given set of conditions. It also may under some circumstances be desirable to provide means for sealing the cracks between the adjacent component pieces of glass layer 25. This may readily be done by means of any suitable adhesive material, for example by flowing a solution of a polymerizable material, such for example as butyl methacrylate, into cracks 33 in Fig. 2 and then causing said material to polymerize in situ. Said adhesive may be either opaque or light-transmitting, but if transparent it has the desirable effect of rendering the cracks substantially completely invisible. However, when no such sealing compound is used, or even if said compound is opaque, the transparent properties of plate 25 are substantially unaffected.

It should be noted that the invention is not limited to the specific arrangement of elements shown in Fig. 1, and many variations thereof are possible within the scope of the invention. For example, it may under some conditions be desirable to bond polarizing layer 22 directly to lens 12 without the intermediate layer of glass 18. This is particularly desirable if layer 25 comprises glass having a higher coefficient of thermal expansion than the glass of lens 12, as for example if lens 12 comprise heat-resistant glass and layer 25 comprise ordinary glass. The cracks in glass layer 25 then have not only the desirable result of substantially eliminating photoelastic effects but also relieve stress resulting from differential expansion between the two layers and thus aid in the adhesion therebetween, and this is true also in similar laminations of glass layers without polarizing material therebetween. Thus, for example, it may under some circumstances be desirable to carry this same procedure further to the extent of treating glass layer 18 in the same manner as layer 25 before lamination to the headlight. All such modifications should be understood as coming within the scope of the invention and it is also to be understood that the invention is not limited to the protection of polarizing material used in conjunction with headlights. There are many similar uses for such polarizing layers and examples thereof include polariscopes, motion picture or slide projectors and the like. In particular it should be noted that the invention is not limited to embodiments utilizing flat protective layers and that on the contrary it is equally applicable to any form of curved cover plate.

Since certain changes may be made in the above product without departing from the scope of the invention, it is intended that all matter contained in the above description, or shown in the accompanying drawings shall be interpreted as illustrative and not in a limiting sense.

What is claimed is:

1. A light-polarizing lamination for use in close proximity to a light source emitting substantial heat, said lamination comprising a sheet of light-polarizing material, a continuous layer of resilient adhesive material affixed to that face of the light-polarizing sheet farthest removed from the light source and means providing a protective layer affixed to said adhesive and positioned to overlie said sheet of polarizing material, said protective layer comprising a plurality of hard, transparent, abrasive-resistant glass elements which when subjected to temperatures of the order of those to which the lamination is subjected show photoelastic strains, the resilience of said adhesive permitting relative movement of said glass elements with respect to one another, said glass elements being of substantially uniform thickness and being positioned in abutting spaced relationship to one another whereby photoelastic strains set up in any such glass element are confined to that element and the degree of such strain developed in the protective layer is of a low order.

2. A light-polarizing lamination for use in close proximity to a light source emitting substantial heat, said lamination comprising a continuous sheet of glass, an adhesive layer affixed to that surface of said sheet farthest removed from the light source, a sheet of light-polarizing material affixed to said adhesive and positioned to overlie said glass sheet, a continuous layer of resilient adhesive material affixed to that face of the light-polarizing sheet farthest removed from the light source and means providing a protective layer affixed to said resilient adhesive and positioned to overlie said sheet of polarizing material, said protective layer comprising a plurality of hard, transparent, abrasive-resistant glass elements which when subjected to temperatures of the order of those to which the lamination is subjected show photoelastic strains, said glass elements being free to move relative to one another while affixed to said resilient adhesive, said glass elements being of substantially uniform thickness and being positioned in abutting spaced relationship to one another whereby photoelastic strains set up in any such glass element are confined to that element and the degree of such strain developed in the protective layer is of a low order.

3. In a headlight for automotive vehicles and the like having a substantially flat-surfaced lens element positioned in close proximity to a filament adapted to emit when energized relatively high heat, a light-polarizing lamination bonded to the outer surface of said lens element, said lamination comprising in superimposed relationship outwardly from said lens element a continuous layer of light-polarizing material, a continuous adhesive layer and a protective layer, said adhesive layer being resilient and bonding said protective layer to said light-polarizing material, said protective layer comprising a plurality of transparent, hard, abrasive-resistant glass elements positioned in contiguous, coplanar, abutting relationship and being free to move relative to one another while remaining affixed to said adhesive, each said glass element being of such thickness and composition as to show slight photoelastic strain when subjected to heat emanating from said filament, the photoelastic strain evidenced by said protective layer being of a low degree, said light-polarizing lamination being substantially coextensive with and covering substantially the entire outer surface of said lens element.

EDWIN H. LAND.

REFERENCES CITED

The following references are of record in the file of this patent:

UNITED STATES PATENTS

| Number | Name | Date |
|---|---|---|
| 1,382,261 | Akeley | June 21, 1921 |
| 1,887,564 | Sherts | Nov. 15, 1932 |
| 1,909,947 | Greppin | May 23, 1933 |
| 2,060,104 | Moulton | Nov. 10, 1936 |
| 2,121,777 | Bailey et al. | June 28, 1938 |
| 2,168,221 | Land | Aug. 1, 1939 |
| 2,173,304 | Land | Sept 19, 1939 |
| 2,185,018 | Sauer | Dec. 26, 1939 |
| 2,189,293 | Ostromislensky | Feb. 6, 1940 |
| 2,202,690 | Fix | May 28, 1940 |
| 2,302,174 | Bolcey et al. | Nov. 17, 1942 |
| 2,314,363 | Moulton | Mar. 23, 1943 |
| 2,319,534 | Crowley | May 18, 1943 |
| 2,340,476 | Keim | Feb. 1, 1944 |
| 2,365,085 | Joyce | Dec. 12, 1944 |